United States Patent
White et al.

(10) Patent No.: US 11,599,676 B2
(45) Date of Patent: Mar. 7, 2023

(54) METHOD AND SYSTEM FOR CONTAINER BACKGROUND UNLOCK

(71) Applicant: BlackBerry Limited, Waterloo (CA)

(72) Inventors: Johnathan George White, St. Albans (GB); Rajeev Ragunathan Nair, Slough (GB); David John Reynolds, Rugby (GB)

(73) Assignee: BlackBerry Limited, Waterloo (CA)

( * ) Notice: Subject to any disclaimer, the term of this patent is extended or adjusted under 35 U.S.C. 154(b) by 742 days.

(21) Appl. No.: 16/295,982

(22) Filed: Mar. 7, 2019

(65) Prior Publication Data

US 2020/0285774 A1    Sep. 10, 2020

(51) Int. Cl.
*G06F 21/62* (2013.01)
*G06F 21/12* (2013.01)
*G06F 21/45* (2013.01)

(52) U.S. Cl.
CPC .......... *G06F 21/6281* (2013.01); *G06F 21/12* (2013.01); *G06F 21/45* (2013.01)

(58) Field of Classification Search
CPC ....... G06F 21/6281; G06F 21/12; G06F 21/45
See application file for complete search history.

(56) References Cited

U.S. PATENT DOCUMENTS

| | | | | |
|---|---|---|---|---|
| 7,111,323 B1* | 9/2006 | Bhatia | ................ | H04L 63/0815 707/999.009 |
| 8,984,274 B1* | 3/2015 | Kerzner | ................ | H04L 9/0891 713/150 |
| 9,076,008 B1* | 7/2015 | Moy | ................ | G06F 21/31 |
| 2014/0047537 A1* | 2/2014 | McCann | ................ | G06F 21/45 726/19 |
| 2015/0011190 A1* | 1/2015 | Kwon | ................ | G06F 21/45 455/411 |
| 2016/0173281 A1* | 6/2016 | White | ................ | H04W 12/06 713/171 |
| 2016/0314308 A1* | 10/2016 | Suzuki | ................ | H04M 1/72463 |
| 2017/0288879 A1* | 10/2017 | Quinlan | ................ | G06F 21/31 |
| 2018/0054513 A1* | 2/2018 | Ma | ................ | H04W 12/06 |
| 2018/0084106 A1* | 3/2018 | Li | ................ | H04W 4/80 |

OTHER PUBLICATIONS

European Extended Search Report; Application No. 20158358.0; dated Jun. 12, 2020; 5 pages.
BlackBerry; "BlackBerry Dynamics Security White Paper, Version 1.7"; 2019; Retrieved from: https://docs.blackberry.com/content/dam/docs-blackberry-com/release-pdfs/en/blackberry-dynamics/BlackBerry%20Dynamics%20Security%20White%20Paper.pdf; 42 pages.

* cited by examiner

*Primary Examiner* — Oleg Korsak
*Assistant Examiner* — Devin E Almeida
(74) *Attorney, Agent, or Firm* — Conley Rose, P. C.; J. Robert Brown, Jr.

(57) ABSTRACT

Described herein is a system and method of application container access, the method includes performing a foreground unlock on an application container; creating a copy of a container key of the application container; locking the application container; receiving a background unlock trigger; determining whether a background unlock is authorized; performing the background unlock on at least a portion of the application container using the copy of the container key in response to determining the background unlock is authorized; and storing data in the at least a portion of the application container while the application container is in the background unlock.

21 Claims, 4 Drawing Sheets

METHOD AND SYSTEM FOR CONTAINER BACKGROUND UNLOCK

BACKGROUND

Devices store various applications. The applications include software that is executed by the device to perform various tasks. Some applications are of a personal nature while other applications are used for business. Applications typically access, store, and/or edit data on the device.

BRIEF DESCRIPTION OF THE DRAWINGS

The present disclosure will be better understood with reference to the drawings, in which.

DETAILED DESCRIPTION

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the example designs and implementations illustrated and described herein, but may be modified within the scope of the appended claims along with their full scope of equivalents.

Described herein are systems and methods of background unlock of application containers. Application container and container may be used interchangeably herein. An application container or container may include an isolated runtime environment for a particular application. Executing the application in a container results in improved access control and security for the application and its associated data. The application container may be encrypted or otherwise protected from unauthorized access. Thus, one application may not access the data of another application in a different container without authorization. Authorization to access a container may be accomplished by providing a credential to generate or retrieve a key to decrypt the contents of the container. According to some approaches, while a container is executing in a foreground state, a key is used to decrypt the entire container, providing full access to the content of the container. Foreground applications include applications that are actively in use by a user. In some approaches, when the container is closed or moved to a background state, the container is fully encrypted and may not be accessed. Background applications include applications that are not currently interacted with by a user. These approaches provide security by preventing access to the container, unless the container is in a foreground state accessed by a user. One problem with these approaches is realized when an application is closed for a period of time, the application must synchronize data when it is unlocked in the foreground. Synchronizing the data may cause an unacceptable delay for a user wishing to access data in the container. For example, an email application in a container may not synchronize emails when the application is closed or operating in the background. When the email application is opened in the foreground, there will be a delay while email is synchronized. Described herein are approaches that provide access to at least a portion of the container while the container is operating in a background state. Thus, data may be synchronized while the container is operating in a background state.

Figure 1:
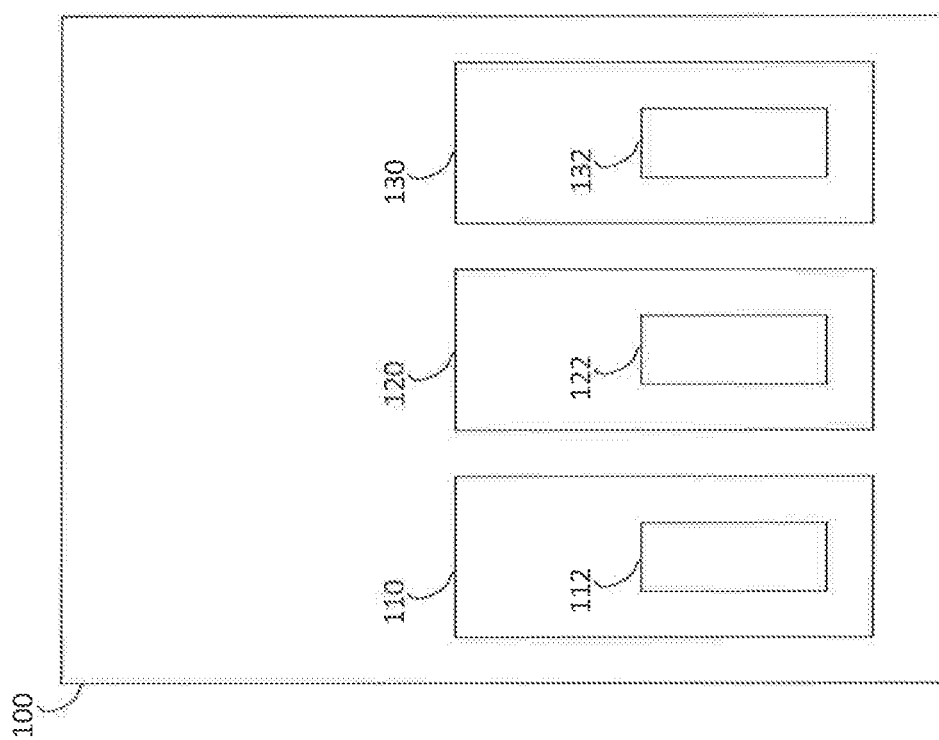
FIG. 1 is a diagram of an embodiment of a device comprising application containers.

FIG. 1 is a diagram of an embodiment of a device 100 which can comprise a device, a mobile device, a personal computer, a server, an internet of things (IoT) device, a vehicle, or any other device that includes containers. The device 100 comprises several containers 110, 120, 130. Each of the containers 110, 120, 130 may be associated with a particular application. For example, container 110 may include an application such as a work email application; container 120 may include an application such as a personal email application; and container 130 may include a work file share application. When any of the containers 110, 120, 130 are operating in the foreground, the container 110, 120, 130 may be fully accessible. Operating in the foreground may require the containers 110, 120, 130 to be unlocked by receiving a credential from a user, e.g., a password which can include a PIN (personal identification number), gesture, biometric data, or other authentication data or any combination. When the credential is received, a key is generated and used to decrypt a container key, which then is used to decrypt application data in the container 110, 120, 130. More than one user and credential combination may be used for each of containers 110, 120, 130 and thus, an independent key hierarchy may be established for each application container based upon each user and credential combination.

While operating in the foreground, a system process may check a policy applied to any of the containers 110, 120, 130 to verify that the container 110, 120, 130 may be operated in the background. If the policy allows the container 110 to be operated in the background, a container key for container 110 is copied and encrypted by a mechanism on the device 100 that does not require user input to decrypt. For example, the container key may be encrypted by a key which is created and stored in secure hardware of the device 100. When a copy of the container key is created, a mechanism may be utilized to set a time limit for use of the copied container key. Various mechanisms may be used, for example, a time stamp of the last successful user authentication may be stored, or an expiration period may be stored, or some other indicator of how long the copied container key is valid.

When container 110 is unlocked in the background, the device 100 may use the copied container key to read or write data in a portion 112 of the container. The copied container key may be configured such that only the portion 112 of the container 110 may be decrypted, thus allowing access only to that portion 112 of the container. In this case, the container 110 may receive data while in the background. Various permissions may be associated with the copied container key, for example the access granted may be write only or read only or some other type of access less than full access. Further, as described above, only the portion 112 of container 110 is accessible, thereby preventing unauthorized access of portions of the container not needed for storing data. In order to access the data received while container 110 was operating in the background, the user will need to authenticate with container 110 before they can interact with the application and corresponding data received in the background by container 110. When the container is opened in the foreground, the mechanism utilized to set the time limit for use of the copied container key may update the expiration time of the copied container key. By receiving data while in the background, the container 110 may not need to synchronize a large amount of data when the container 110 is moved to the foreground. While in the foreground, all of the container 110 may be accessible. If containers 120 and 130 are operated in the background unlock, portions 122 and 132 respectively may be unlocked. In some embodiments, the entire container 110, 120, or 130 may be background unlocked based upon a policy associated with the container 110, 120, or 130 or some other control mechanism.

Figure 2:
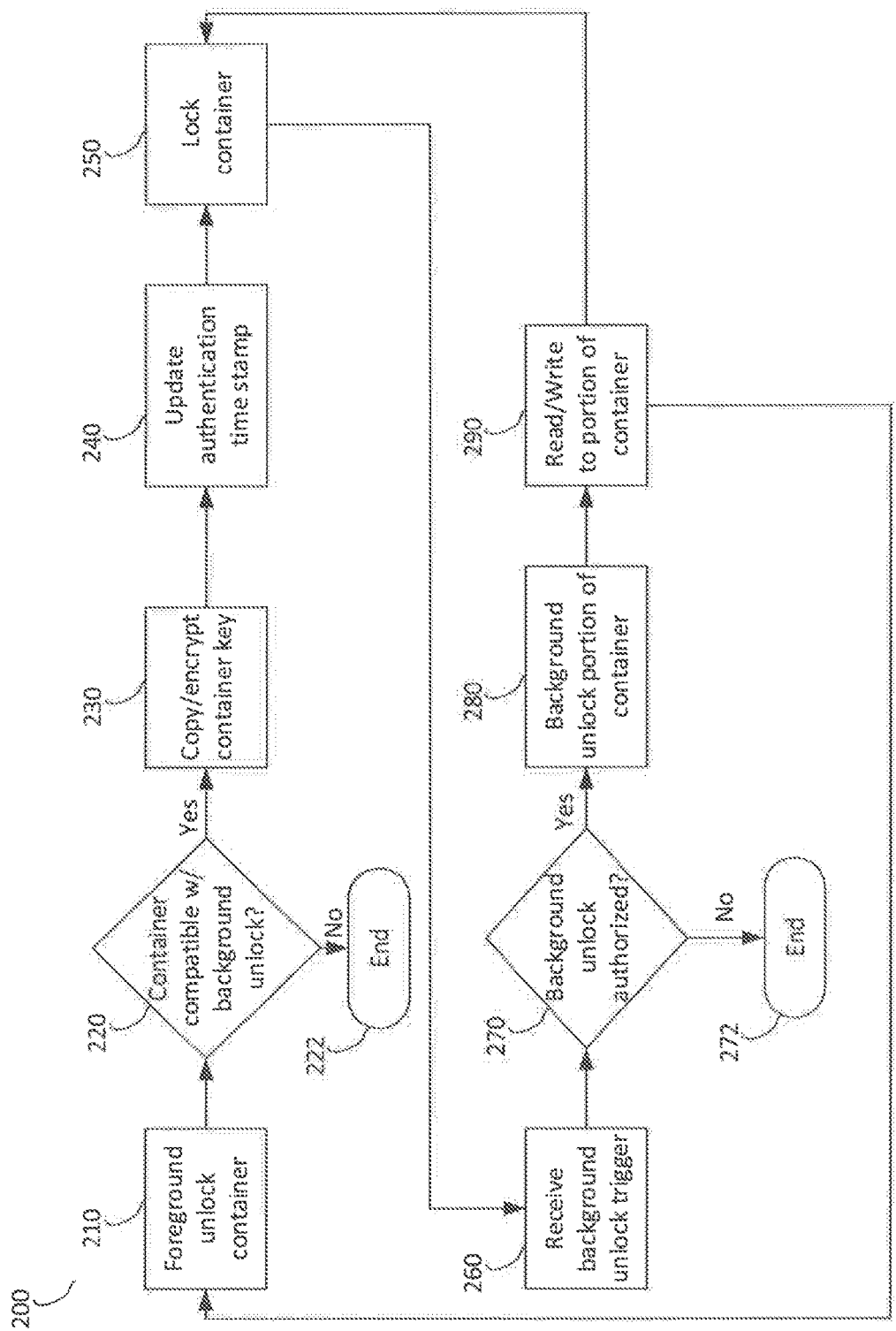
FIG. 2 is a flow diagram of an embodiment of a method of background unlock of an application container.

FIG. 2 is a diagram of an embodiment of a method 200 of background unlock of an application container. The method 200 begins at step 210 when a container, for example container 110, on a device, for example device 100, is unlocked in the foreground. At step 220, a system on the device 100 determines if the container is compatible with a background unlock. Several factors may be considered in determining whether a container is compatible with background unlock. One possible factor is policy control, which an information technology (IT) admin may control. These policy controls may determine whether the background unlock feature can be used. For example, if a company provides the container, it would be the company's IT admin who controls the policy for their users. A second possible factor is a permission control for the background unlock feature maintained by a security platform provider. The security platform provider provides the application developer with a permissions blob which goes into the application developer's application code. The security platform code then verifies the permissions blob as part of both the setup and execution phase of the container application. This may be a static check within the container application code which verifies the permission blob is correct and official. For example, this may be accomplished by the static check using a RSA public key embedded into the software development kit (SDK) to verify a signature of a private key which is stored securely in the app. This allows the security platform provider to give a security review and/or training for application developers who wish to make use of the background unlock feature and make it available to their users. The security platform provider can ensure the application developers have correctly implemented and adhered to the user interface (UI) control and that they have considered which data should or should not be available in the background.

If the container is not compatible with background unlock, the method 200 ends at step 222. If the container is compatible with the background unlock, the method 200 proceeds to step 230 where a copy of the container key is made and encrypted. The container key may be the root of a key hierarchy, i.e., all items within an application container are not protected by the same key, but via a key hierarchy applicable data can be accessed.

The copy of the container key may be configured to only unlock a portion of the container. The copy of the container key may be encrypted such that user interaction is not required to decrypt the key and subsequently the portion of the container. The copy of the container key may be encrypted using available hardware or software encryption mechanisms in the device to protect against offline attacks. The copy of the container key may be encrypted in a mechanism which does not rely on user interaction to decrypt. Using hardware protection makes malicious extraction from the device far more difficult than if the key were not encrypted. Hardware protection may include trusted execution environments and/or secure elements in a device. Hardware protection provides data security solutions that prevent extraction of keys from the hardware of the device, even if the operating system and/or hardware of the device are compromised. For example, on some operating systems, the copy of the container key is encrypted by an elliptic curve integrated encryption scheme (ECIES) algorithm. However, other schemes and mechanisms may be used by the device to encrypt the copy of the container key.

Optionally, at step 240 an authentication time stamp or some other mechanism for controlling how long the copy of the container key is valid is updated. In some cases, other techniques may be used to determine the validity of the copy of the container key. Optionally at step 250, the container may be locked by a user or by a system on the device. For example, the container may automatically lock if it is not used for a threshold time period. Locking the application container may result from various other types of operations, e.g., a user closing the app, the app crashing, or the system killing the app.

At step 260, the container receives or detects a background unlock trigger. The trigger may be a notification of data to be pushed, selectively waking up applications based on previous usage patterns, e.g., opportunistic fetch, wake up of an application in response to certain system events, e.g., connected to mains power event, or connected to Wi-Fi event. Other conditions may trigger a background unlock of the container as determined by an operating system and/or the application. After receiving or detecting the background unlock trigger, the device determines if a background unlock is authorized at step 270. Authorization may be determined based upon one or more factors. For example, this step verifies that a copy of the container key is present on the device. Further, in the case where the container key has an expiration time, the container key is checked to confirm that it is not expired. Other factors may be considered in determining whether a background unlock is authorized, for example the location of the device and/or the type of access requested by the background unlock trigger may be considered.

If the background unlock is not authorized, the method 200 ends at step 272. If the background unlock is authorized, the method 200 continues to step 280 where a background unlock is performed using the copy of the container key. The background unlock may provide access to only a portion of the container, for example, a storage area for data. Further, the background unlock may only allow certain types of commands to be executed, for example, only write commands may be executed. The application developer could choose which items are available for access while the container is background unlocked, or could provide access to the entire application container.

After the background unlock, the container receives data or performs other operations in accordance with the background unlock trigger at step 290. Following step 290, the container may continue to operate in a background state, may be unlocked in the foreground at step 210, or may return to a locked state at step 250. When the user brings the application container to the foreground by a foreground unlock, even if the container has been granted background access, the user must authenticate the application by using a method of authentication (e.g., password, biometrics, two factor). Thus, even though the data can be read/write in the background, the user cannot look at or interact with the data until the user verifies they are authorized to do so.

In some embodiments, on subsequent reboots of the device or restarting of an application in a container, steps 210 through 240 may not be necessary and the container may proceed directly to step 260 or step 270 because a copy of the container key has been previously stored. For example, an application in a container may be launched in the foreground and a copy of the container key may be stored according to step 230. The device may be restarted, but the copy of the container key may be stored in persistent memory such that the container may be unlocked in the background without preforming steps 210-240 after the reboot.

Figure 3:
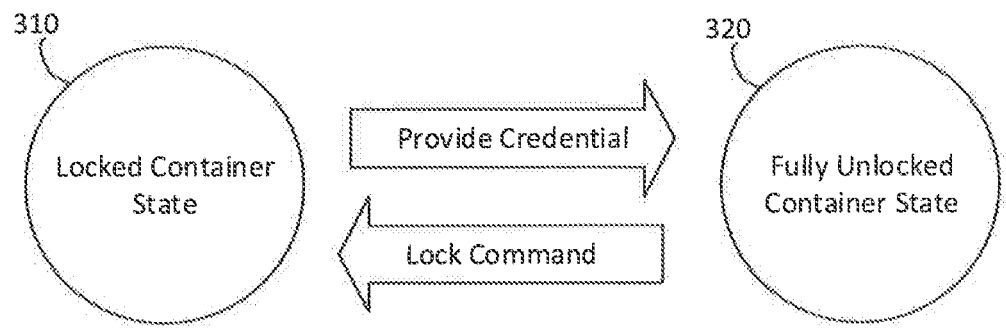
FIG. 3 is a state diagram of an embodiment of foreground unlock container states.

FIG. 3 is a state diagram of an embodiment of foreground unlock container states. When a container is started in the foreground, the container is in a locked state 310. The container will remain in a locked state 310 until a user provides a credential to unlock the container in the foreground. After receiving the appropriate credential, the container enters a fully unlocked state 320 in the foreground. While in the fully unlocked state 320, the system may create a copy of the container key and store the copy of the container key for future use in performing a background unlock. Upon receiving a container lock command, the container returns to the locked state 310. The container lock command may be received via an interface from a user or may occur automatically based upon one or more conditions being met, e.g., a timeout lock.

Figure 4:
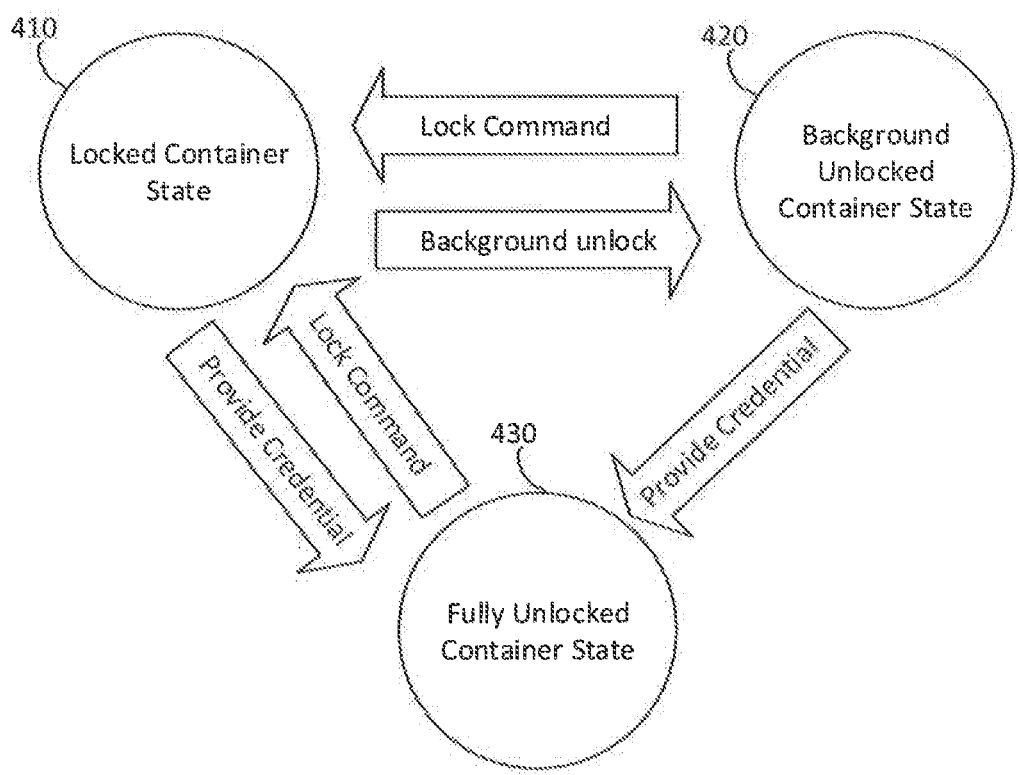
FIG. 4 is a state diagram of an embodiment of background unlock container states.

FIG. 4 is a state diagram of an embodiment of background unlock container states. When a container is started in the background, the container is in a locked state 410. A background unlock may be performed using previously stored keys without user interaction. The background unlock may happen in response to a trigger, for example a push notice from an email server. After receiving the appropriate hardware key, the container enters a background unlocked state 420. While in the background unlocked state 420, all or a portion of the container data may be accessed. Further, all or a portion of data may be accepted by the container. For example, a trigger event may occur for a received email messages, the email headers and bodies may be synced in the background, but attachments may not be synced until the application is launched in the foreground. A user may provide a credential to fully unlock the container. After receiving the appropriate credential, the container enters a fully unlocked state 430 in the foreground. Upon receiving a container lock command, the container returns to the locked state 410.

Figure 5:
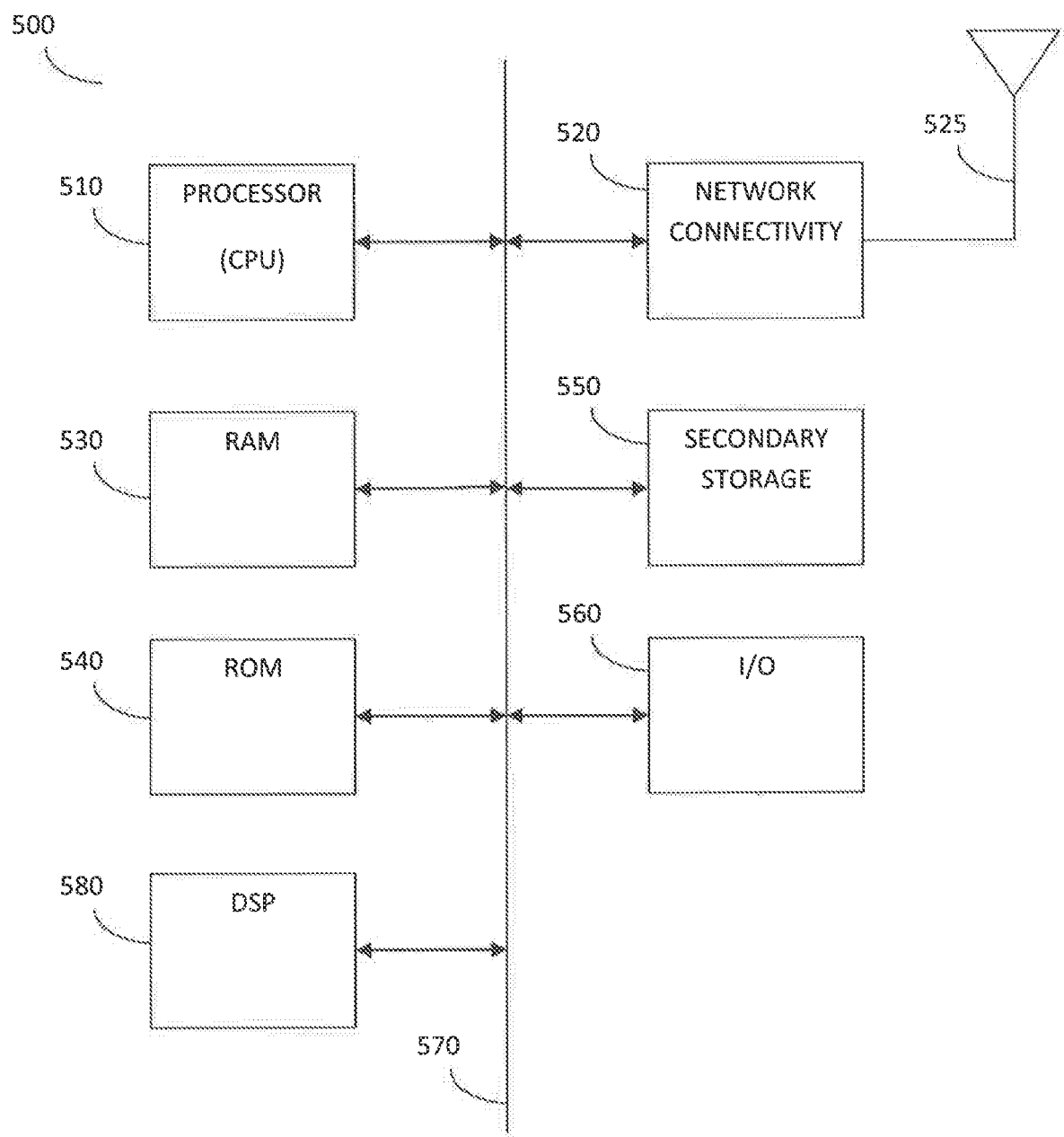
FIG. 5 is a diagram of an embodiment of a system suitable for implementing one or more embodiments described herein.

FIG. 5 is a diagram of an embodiment of a system 500 that includes a processor 510 suitable for implementing one or more embodiments disclosed herein. The processor 510 may control the overall operation of the system 500.

In addition to the processor 510 (which may be referred to as a central processor unit or CPU), the system 500 can include network connectivity devices 520, random access memory (RAM) 530, read only memory (ROM) 540, secondary storage 550, and input/output (I/O) devices 560. These components can communicate with one another via a bus 570. In some cases, some of these components may not be present or may be combined in various combinations with one another or with other components not shown. These components can be located in a single physical entity or in more than one physical entity. Any actions described herein as being taken by the processor 510 can be taken by the processor 510 alone or by the processor 510 in conjunction with one or more components shown or not shown in the drawing, such as a digital signal processor (DSP) 580. Although the DSP 580 is shown as a separate component, the DSP 580 can be incorporated into the processor 510.

The processor 510 executes instructions, codes, computer programs, or scripts that it can access from the network connectivity devices 520, RAM 530, ROM 540, or secondary storage 550 (which can include various disk-based systems such as hard disk, floppy disk, or optical disk). While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips and may be a hardware device capable of executing computer instructions.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, controller area network (CAN), domestic digital bus (D2B), and/or other devices for connecting to networks. These network connectivity devices 520 may enable the processor 510 to communicate with the Internet or one or more telecommunications networks or other networks from which the processor 510 can receive information or to which the processor 510 can output information. The network connectivity devices 520 can also include one or more transceiver components 525 capable of transmitting and/or receiving data wirelessly.

The RAM 530 can be used to store volatile data and perhaps to store instructions that are executed by the processor 510. The ROM 540 is a non-volatile memory device that typically has a smaller memory capacity than the memory capacity of the secondary storage 550. ROM 540 can be used to store instructions and perhaps data that are read during execution of the instructions. Access to both RAM 530 and ROM 540 is typically faster than to secondary storage 550. The secondary storage 550 is typically comprised of one or more disk drives or tape drives and can be used for non-volatile storage of data or as an over-flow data storage device if RAM 530 is not large enough to hold all working data. Secondary storage 550 may be used to store programs that are loaded into RAM 530 when such programs are selected for execution.

The I/O devices 560 may include any one or more of the following: liquid crystal displays (LCDs), touch screen displays, keyboards, keypads, switches, dials, mice, track balls, voice recognizers, card readers, paper tape readers, printers, video monitors, or other input/output devices. Also, the transceiver components 525 can be considered to be a component of the I/O devices 560 instead of or in addition to being a component of the network connectivity devices 520.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

What is claimed is:

1. A method of application container access, the method comprising:
performing a foreground unlock on an application container;
creating a copy of a container key of the application container;
locking the application container;
receiving a background unlock trigger;
determining whether a background unlock is authorized;
performing the background unlock on at least a portion of the application container using the copy of the container key in response to determining the background unlock is authorized, wherein the background unlock enables a type of access that is less than full access to the application container; and
storing data in the at least a portion of the application container while the application container is in the background unlock.

2. The method of claim 1 further comprising, prior to creating the copy of the container key, determining the application container is compatible with the background unlock.

3. The method of claim 2, wherein determining the application container is compatible with the background unlock comprises verifying a policy for the application container.

4. The method of claim 1, further comprising updating an authentication time stamp in response to creating the copy of the container key, wherein determining whether the background unlock is authorized comprises verifying the authentication time stamp is within a particular time period.

5. The method of claim 1, wherein the background unlock trigger comprises one or more of:
a remote notification; or
a background system operation.

6. The method of claim 1, further comprising, after storing the data:
receiving a subsequent background unlock trigger;
determining whether the background unlock is authorized; and
performing the background unlock on at least the portion of the application container using the copy of the container key in response to determining the background unlock is authorized.

7. The method of claim 1, further comprising, after storing the data:
performing a foreground unlock on an application container; and
allowing access to the data.

8. A device comprising:
a memory comprising an application container; and
a processor in communication with the memory, the processor configured to:
perform a foreground unlock on the application container;
create a copy of a container key of the application container;
lock the application container;
receive a background unlock trigger;
determine whether a background unlock is authorized;
perform the background unlock on at least a portion of the application container using the copy of the container key when the background unlock is authorized, wherein the background unlock enables a type of access that is less than full access to the application container; and
store data in the at least a portion of the application container while the application container is in the background unlock.

9. The device of claim 8, wherein the processor is further configured to determine the application container is compatible with the background unlock.

10. The device of claim 9, wherein the processor is further configured to verify a policy for the application container.

11. The device of claim 8, wherein the processor is further configured to update an authentication time stamp in response to creating the copy of the container key, and wherein the processor being onfigured to determine whether the background unlock is authorized comprises the processor being configured to verify the authentication time stamp is within a particular time period.

12. The device of claim 8, wherein the background unlock trigger comprises one or more of:
a remote notification; or
a background system operation.

13. The device of claim 8, wherein the processor is further configured to:
receive a subsequent background unlock trigger;
determine whether the background unlock is authorized; and
perform the background unlock on at least the portion of the application container using the copy of the container key when the background unlock is authorized.

14. The device of claim 8, wherein the processor is further configured to:
perform a foreground unlock on an application container; and
allow access to the data.

15. A non-transitory computer readable storage medium comprising instructions which when executed by a processor cause the processor to:
perform a foreground unlock on an application container;
create a copy of a container key of the application container;
lock the application container;
receive a background unlock trigger;
determine whether a background unlock is authorized;
perform the background unlock on at least a portion of the application container using the copy of the container key when the background unlock is authorized, wherein the background unlock enables a type of access that is less than full access to the application container; and
store data in the at least a portion of the application container while the application container is in the background unlock.

16. The non-transitory computer readable storage medium of claim 15, wherein the instructions further cause the processor to determine the application container is compatible with the background unlock.

17. The non-transitory computer readable storage medium of claim 16, wherein the instructions further cause the processor to verify a policy for the application container.

18. The non-transitory computer readable storage medium of claim 15, wherein the instructions further cause the processor to update an authentication time stamp in response to creating the copy of the container key, and wherein the instructions causing the processor to determine whether the background unlock is authorized comprises instructions causing the processor to verify the authentication time stamp is within a particular time period.

19. The non-transitory computer readable storage medium of claim 15, wherein the background unlock trigger comprises one or more of:
   a remote notification; or
   a background system operation.

20. The non-transitory computer readable storage medium of claim 15, wherein the instructions further cause the processor to:
   receive a subsequent background unlock trigger;
   determine whether the background unlock is authorized; and
   perform the background unlock on at least the portion of the application container using the copy of the container key when the background unlock is authorized.

21. The non-transitory computer readable storage medium of claim 15, wherein the instructions further cause the processor to:
   perform a foreground unlock on an application container; and
   allow access to the data.

\* \* \* \* \*